May 1, 1928. 1,668,316
R. HORTON
MILK PASTEURIZING SYSTEM
Filed June 21, 1926 3 Sheets-Sheet 1

WITNESS
INVENTOR
RALPH HORTON
ATTORNEYS

May 1, 1928.

R. HORTON

MILK PASTEURIZING SYSTEM

Filed June 21, 1926

WITNESS
G. V. Rasmussen

INVENTOR
RALPH HORTON
BY
ATTORNEYS

May 1, 1928.  R. HORTON  1,668,316
MILK PASTEURIZING SYSTEM
Filed June 21, 1926   3 Sheets-Sheet 3
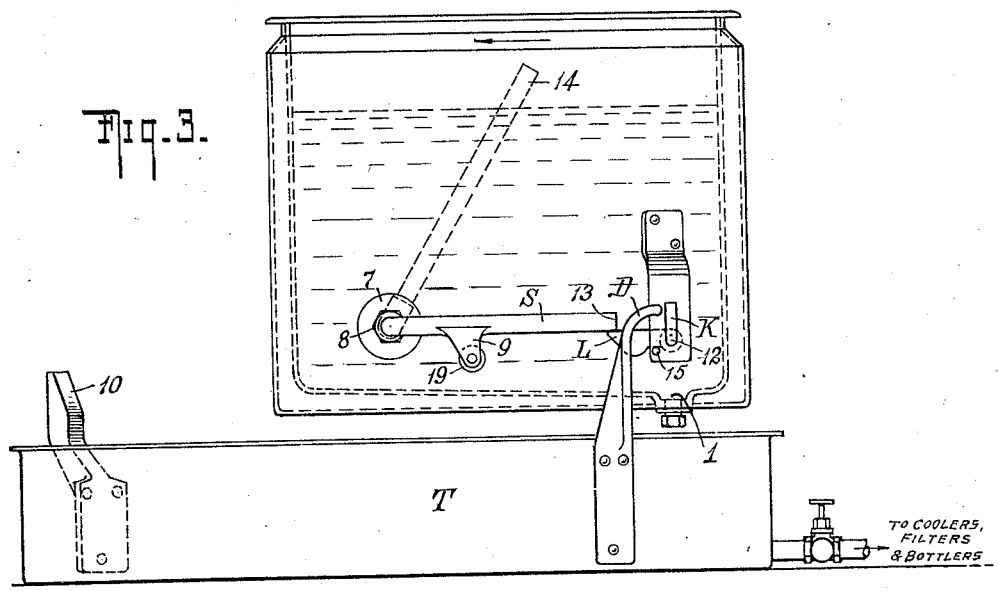
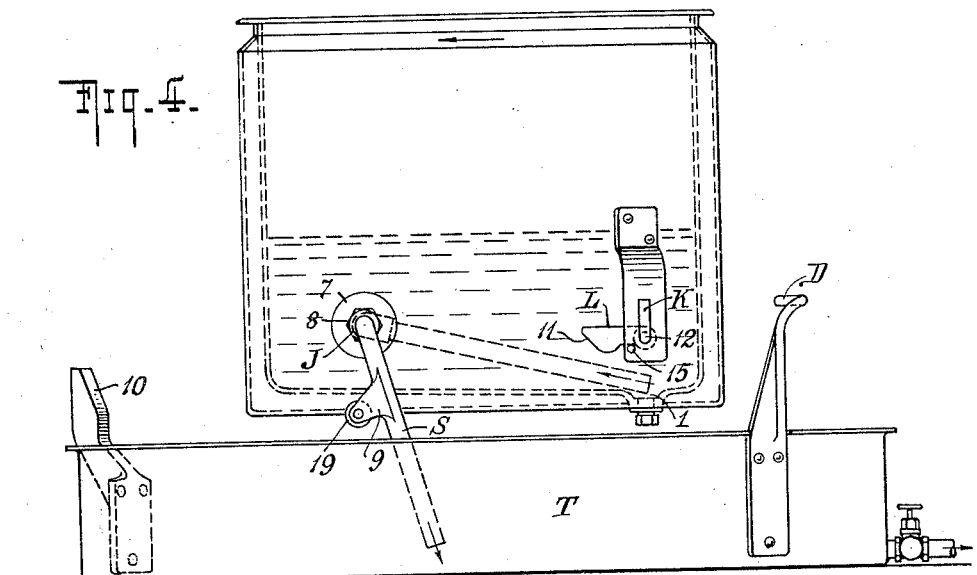
WITNESS
G. V. Rasmussen
INVENTOR
RALPH HORTON
BY
Niesen Ackerink
ATTORNEYS Patented May 1, 1928.

1,668,316

UNITED STATES PATENT OFFICE.

RALPH HORTON, OF NEW YORK, N. Y.

MILK-PASTEURIZING SYSTEM.

Application filed June 21, 1926. Serial No. 117,363.

This invention relates to milk Pasteurizing systems, and more particularly to a discharging device for rotary positive milk holders in such systems.

The Pasteurization of milk is effected by heating the milk to a critical temperature which is usually between 138° to 145° F., and then holding the heated milk at this temperature for a definite period which is usually taken as thirty minutes. The customary procedure is to conduct milk from a storage reservoir to a heater where the raw milk is heated to a Pasteurizing temperature. The heated milk is then delivered to a milk holder which holds the milk at a Pasteurizing temperature for the prescribed period of time. After the milk has been Pasteurized and is ready to be discharged from the Pasteurizing holder, it is essential that the treated milk should not come into contact with unsterilized apparatus or become mixed with un-Pasteurized milk. When valves and intricate parts are used to control the flow and the discharge of the Pasteurized milk, it is difficult to maintain the aforesaid parts in a sterilized condition. Moreover, any tank which has a valve must have a valve seat with the consequent result that some leakage or seepage of un-Pasteurized milk occurs around the aforesaid seat. As the valve is usually located at a point in the tank or holder which is difficult, if not impractical to heat, the un-Pasteurized milk which leaks or seeps through the valve is not subjected to the same heat treatment as the milk in the tank or holder. Any contaminated milk which seeps through he valve will be unaffected by the holding or Pasteurization treatment, and will, as the tank is emptied re-contaminate the whole body of milk. Of course, under the aforesaid conditions the benefit of the Pasteurization treatment is absolutely destroyed and vitiated.

The primary object of the invention is to eliminate any possibility of recontamination of Pasteurized milk at the point of discharge in milk holder.

Another object of the invention is to provide a milk holder particularly one of the positive rotary type, with an automatic siphon discharge.

The invention will be best understood by reference to the accompanying drawings forming a part of this specification, and, in which:—

Fig. 3 is an elevational view of one of the compartments of the milk holder showing an oscillatable siphon discharge tube in an inoperative position;

Fig. 4 is a similar view to Fig. 3 showing the discharge tube in an operative position;

Similar characters of reference designate similar parts throughout the accompanying drawings.

Figure 1:
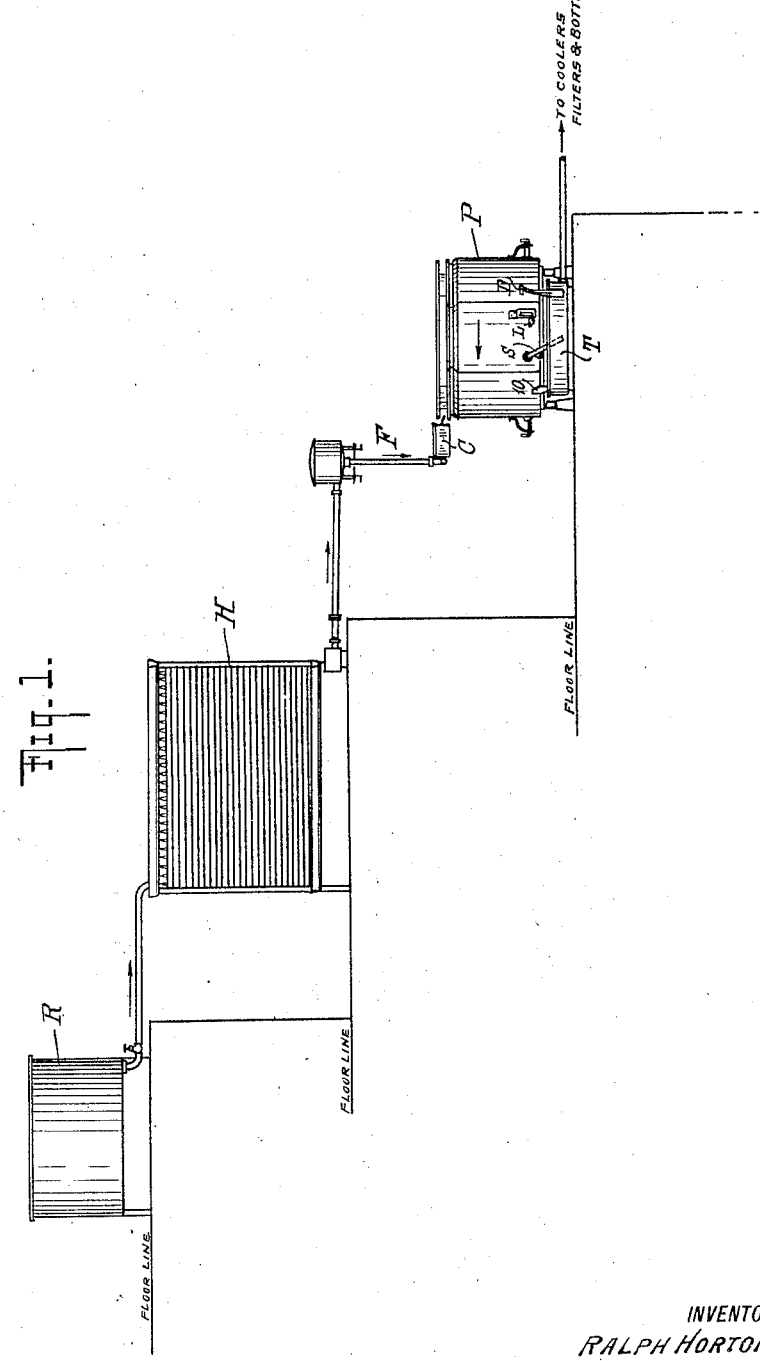
Fig. 1 is a diagrammatic view of a Pasteurization system of preferred type.

The Pasteurizing system herein shown is one of the gravity type, but my invention is not limited to use with this type of system as it is equally adaptable to any of the well-known milk Pasteurizing systems. In the system shown in Fig. 1 the raw milk is pumped to a storage reservoir R at the uppermost level of the system. From this reservoir the milk runs by gravity to the rest of the system, first passing through a heater H of any approved type where it is heated to a Pasteurizing temperature. The heated milk is conducted from the heater to a milk holder P by means of an approved feed system F. The holder P is herein depicted as a continuous positive rotary one with heating jackets, but any preferred holder may be provided with my improved discharging mechanism.

Figure 2:
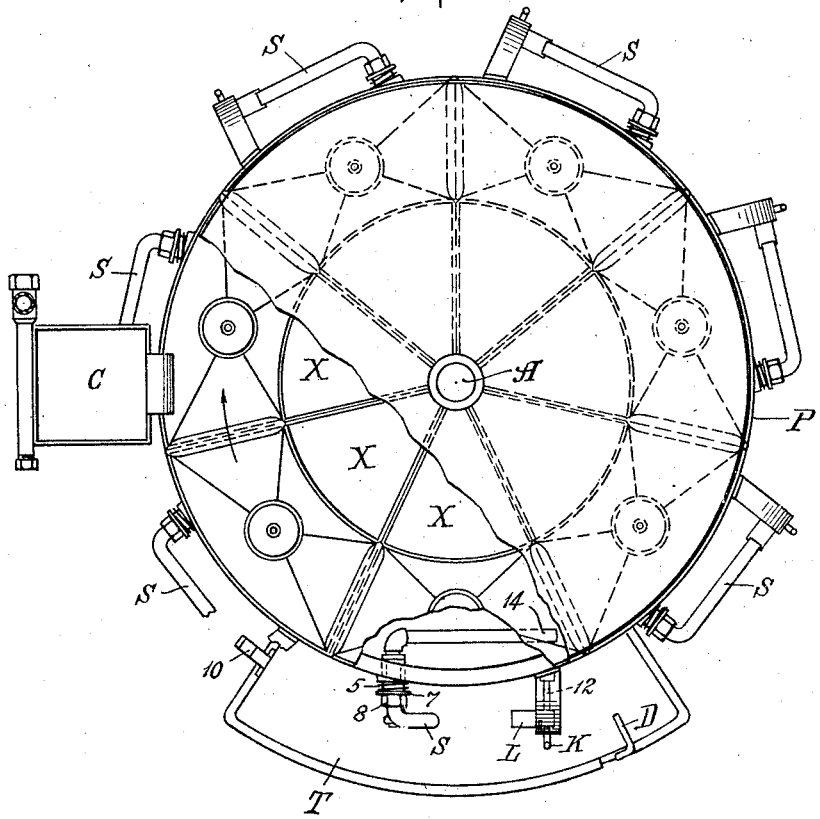
Fig. 2 shows a plan view of the positive rotary milk holder illustrated in Fig. 1.

The rotary multi-compartment holder revolves about an axis A (see Fig. 2) and while in motion, each compartment is successively filled by the charging device C with milk heated to a Pasteurizing temperature. The heated milk is held in each of the thus filled compartments for the prescribed period, for example thirty minutes, at a Pasteurizing temperature. By the time the holder has turned through a part of a circle so that the filled compartment has reached a stationary discharge cam or tripper D, this cam strikes a projection K on latch L so as to trip or release an oscillatable siphon discharge tube S which drops into a discharge tank T. The siphon tube S is substantially V-shaped with the exterior leg thereof lower than the interior leg. The milk immediately begins to flow through the siphon tube due to the head of liquid above the open end 13 of the exterior leg. The flow continues even after the level of the liquid falls below the joint S of the siphon tube because a siphon has been established. As the open end 14 of the interior leg fits in a depression or sump, substantially the entire compartment is emptied during the travel past tank T. As the holder P is rotating continuously, each compartment is successively filled by the charging device C with milk heated to a Pasteurizing temperature, then held for the Pasteurizing period at a Pasteurizing temperature, and finally emptied into tank T. The apparatus functions continuously and automatically.

After the discharge of any compartment, a roller 19 on a projection 9 positioned on the underside of the exterior leg of the siphon tube strikes a stationary cam 10 at the end of tank T which returns the tube to an inoperative latched position. The open end 13 of the exterior leg strikes the underside of tongue 11 of the latch and rotates it upwardly about bar 12. When the end 13 has cleared the tongue, the latter, due to gravity, drops back into a latched position against stop 15. The exterior leg then descends and engages the tongue so as to be held in an inoperative latched position. In this position the open end 14 of the interior leg is adjacent to the top of the compartment so that no milk can enter this leg while the compartment is being filled during its passage by charging device C.

Figure 5:
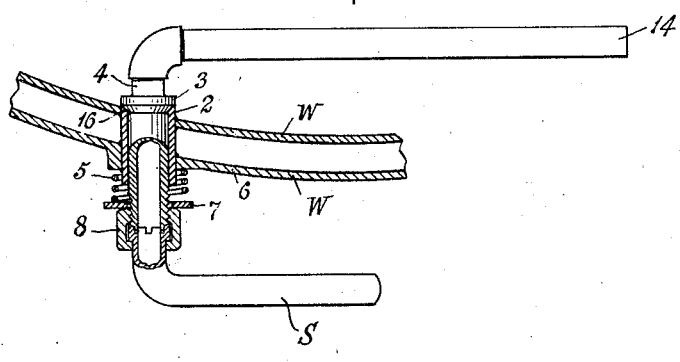
Fig. 5 shows a fragmentary detail view of the joint of the siphon tube with the holder.

In order to prevent any leakage at the point where the siphon tube passes through the walls W of the jacketed tank a ground joint is formed between a nipple 2 positioned in the wall of the tank and jacket and a collar 3 secured to the connecting tube 4 (see Fig. 5). A spring 5 compressed between the jacket wall 6 and a washer 7 forces the connecting tube outwardly so as to maintain a tight joint at 16 between the nipple 2 and the collar 3. A union 8 is provided at the outer end of connecting tube 4 to facilitate the assembly and dismantling of the siphon tube. As this tube has no valves or intricate parts in its construction, there is no possibility of leakage or seepage of un-Pasteurized milk to exterior parts thereof. Any milk which leaks through the ground joint falls upon the floor. Consequently, all possibility of recontamination of the Pasteurized milk with un-Pasteurized milk during the discharge of the milk holder is eliminated. It is to be noted that with my improved siphon discharge no valves, intricate parts, or the like are used so that no leakage or seepage can occur at valve seats or the like, thus eliminating all possibility of re-contamination of the Pasteurized milk.

It will be further observed that my invention provides a milk holder with a discharge device which is simple in construction and operation, which is economical to manufacture, which is easily assembled and dismantled, and which is absolutely sanitary.

Various modifications may be made without departing from the nature of my invention as defined in the appended claims.

I claim:

1. In combination a milk holder and a siphon means for discharging the holder, said siphon means being oscillatably mounted in the side of said holder below the milk line, one leg of said siphon means being positioned within the holder and having its open end, when the tank contains milk up to the milk line, held above said milk line, said open end of said leg in the discharging position occupying a position adjacent to the lowest part of the holder, the other leg of said siphon means being positioned outside of the holder and, in the discharging position extending in a downward direction to permit gravity discharge through said siphon means of the entire contents of the holder.

2. In combination a milk holder and a siphon means for discharging the holder, said siphon means being oscillatably mounted in the side of said holder below the milk line and consisting of two legs joined to each other by an oscillatable connection so as to include an angle between them, one leg of said siphon means being positioned within the holder and having its open end, when the tank contains milk up to the milk line, held above said milk line, said open end of said leg in the discharging position occupying a position adjacent to the lowest part of the holder, the other leg of said siphon means being positioned outside of the holder and, in the discharging position extending in a downward direction to permit gravity discharge through said siphon means of the entire contents of the holder.

3. In combination, a milk holder, an oscillatable siphon tube mounted in the side of said holder, and means to normally hold the siphon tube in an inoperative position, the said means being adapted to disengage the siphon tube into a discharge position.

4. In combination, a multi-compartment milk holder rotatably mounted, an oscillatable siphon tube mounted in the exterior side of each of said compartments, a latch secured to the side of each compartment to hold the siphon tube mounted therein in an inoperative position, a stationary tripper adapted to disengage each latch as it comes in contact therewith so as to release each siphon tube and thus cause the discharge of each compartment, and means to return each siphon tube to an inoperative latched position.

5. In combination, a multi-compartment milk holder rotatably mounted, the said vessel having a heating jacket incorporated therewith, an oscillatable siphon tube mounted in the exterior side of each of said compartments, a latch secured to the side of each compartment to hold the siphon tube mounted therein in an inoperative position, a stationary tripper adapted to disengage each latch as it comes in contact therewith so as to release each siphon tube and thus cause the discharge of each compartment, and means to return each siphon tube to an inoperative latched position.

In testimony whereof I have hereunto set my hand.

RALPH HORTON.